(12) United States Patent
Dutton

(10) Patent No.: US 8,483,890 B2
(45) Date of Patent: Jul. 9, 2013

(54) IDENTIFICATION OF SHIP STATE TONAL PARAMETERS FOR USE IN RELATIVE GPS SHIPBOARD LANDING SYSTEMS

(75) Inventor: Kevin E. Dutton, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 259 days.

(21) Appl. No.: 13/084,889

(22) Filed: Apr. 12, 2011

(65) Prior Publication Data

US 2012/0265375 A1    Oct. 18, 2012

(51) Int. Cl.
*B63G 11/00* (2006.01)
(52) U.S. Cl.
USPC .................................. 701/16; 342/357.27
(58) Field of Classification Search
USPC ......... 701/16, 3, 7, 21, 470, 300; 342/357.27, 342/106–109, 33–36, 38, 113, 132, 134; 340/945, 948, 984; 166/355; 441/21, 3
See application file for complete search history.

(56) References Cited

U.S. PATENT DOCUMENTS

| | | | |
|---|---|---|---|
| 3,131,018 A | 4/1964 | Brodzinsky | |
| 5,235,513 A | 8/1993 | Velger | |
| 5,287,104 A | 2/1994 | Shemwell | |
| 6,064,924 A | 5/2000 | Fleischmann | |
| 2008/0319592 A1 | 12/2008 | Colclough | |
| 2009/0243911 A1* | 10/2009 | Cornic et al. | 342/36 |
| 2011/0066307 A1* | 3/2011 | Hiebl | 701/16 |

* cited by examiner

*Primary Examiner* — Marthe Marc-Coleman
(74) *Attorney, Agent, or Firm* — Fogg & Powers LLC

(57) ABSTRACT

A method and system for identification of ship state tonal parameters during an approach and landing of an aircraft on a ship is provided. The method comprises determining whether ship state data is available to the aircraft prior to landing of the aircraft, and when the ship state data is available to the aircraft, receiving the ship state data at the aircraft and estimating tonal parameters of the ship state data. When the ship state data is not available to the aircraft, a determination is made whether a ship tonal parameter estimation is complete. When the ship tonal parameter estimation is complete, ship state data is estimated using any last received ship state data and estimates of the ship tonal parameters. One or more relative navigation algorithms are then run using the received ship state data or the estimated ship state data to safely land the aircraft on the ship.

20 Claims, 3 Drawing Sheets

IDENTIFICATION OF SHIP STATE TONAL PARAMETERS FOR USE IN RELATIVE GPS SHIPBOARD LANDING SYSTEMS

BACKGROUND

Landing an aircraft on an aircraft carrier is a very demanding task. Current aircraft carrier landing systems do not try to estimate ship parameters as they assume that ship state data is available, and does not have to be estimated. Future aircraft carrier landing systems, such as the Joint Precision Approach and Landing System (JPALS) and the Navy Unmanned Combat Air System (UCAS) will employ Global Positioning System (GPS) data from the ship and aircraft, in combination with high rate ship and aircraft state data (e.g., 20 Hz or higher rate).

When a datalink is involved, such as for JPALS or Navy UCAS, the possibility always exists that the uplink to the aircraft may be lost. If the ship to aircraft datalink is not available for the critical final few seconds of the landing, it may not be possible to continue the landing safely. For example, loss of the ship to aircraft datalink during the final 10-12 seconds of a JPALS-type aircraft carrier landing could result in a waveoff or, when waveoff is no longer an option (within the final 5 seconds), loss of the aircraft.

SUMMARY

A method and system for identification of ship state tonal parameters during an approach and landing of an aircraft on a ship is provided. The method comprises determining whether ship state data is available to the aircraft prior to landing of the aircraft, and when the ship state data is available to the aircraft, receiving the ship state data at the aircraft and estimating tonal parameters of the ship state data. When the ship state data is not available to the aircraft, a determination is made whether a ship tonal parameter estimation is complete. When the ship tonal parameter estimation is complete, ship state data is estimated using any last received ship state data and estimates of the ship tonal parameters. One or more relative navigation algorithms are then run using the received ship state data or the estimated ship state data to safely land the aircraft on the ship.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
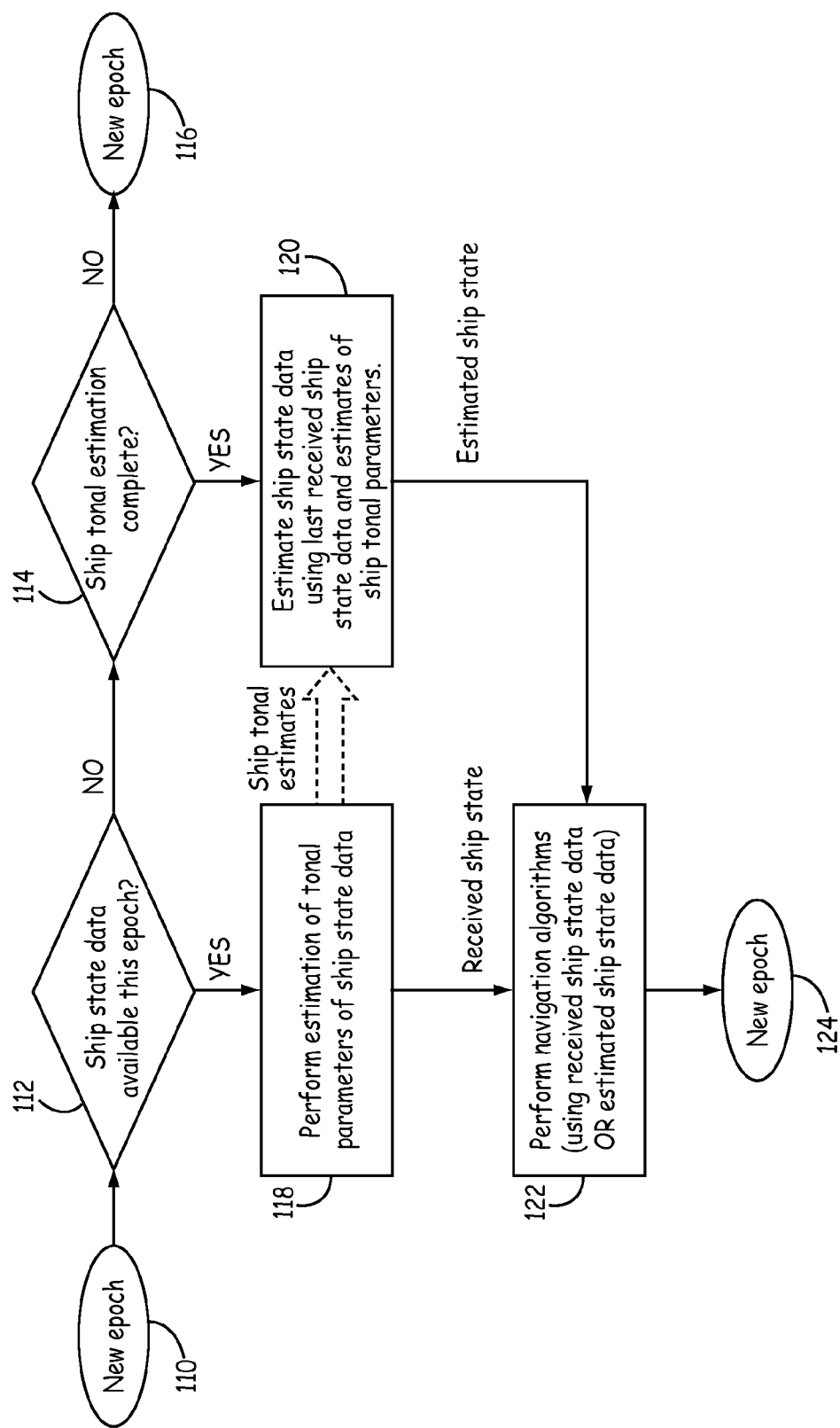
FIG. 1 is a flow diagram of a method for identification of ship state tonal parameters during a relative GPS shipboard landing.

In the following detailed description, reference is made to the accompanying drawings in which is shown by way of example specific illustrative embodiments. It is to be understood that other embodiments may be utilized and that mechanical and electrical changes may be made. The following detailed description is, therefore, not to be taken in a limiting sense.

A method and system is provided for identification of ship state tonal parameters for use in relative GPS shipboard landing systems, such as GPS-assisted aircraft carrier landing systems. The present approach provides for a robust GPS-enabled aircraft carrier landing system that accounts for the potential loss of all datalink messages in the final few seconds of a carrier landing. The present method provides for extrapolating current ship state data into the future when there is a data link loss. This increases the overall availability and continuity of the landing system.

An aircraft carrier is such a large vehicle that its motion is predictable for a few seconds into the future using information about prior motion. Some of the ship state parameters, such as ship roll, pitch, and heading, as well as Center of Motion (CM) heave, surge, and sway, exhibit sinusoidal variations over time. These parameters can be constantly estimated using standard frequency/amplitude/phase single-tone or multiple-tone sinusoidal estimation techniques, such as maximum likelihood or expectation-maximization.

If the datalink is lost at any time during the aircraft approach to the carrier, the results of the sinusoidal estimation techniques can be used to replace those elements of the datalink that are sinusoidal, and the approach can be continued, making it possible to have a safe landing.

For precision landing on an aircraft carrier using GPS, ship state data, such as velocity, acceleration, Euler angles, etc. is usually transmitted to the aircraft at a high rate (e.g., 20 Hz). While the ship state data is being received by the aircraft, the aircraft will continually estimate the frequency, amplitude, and phase of the several sinusoids that make up such state parameters such as pitch, roll, heading, as well as CM heave, surge, and sway.

While estimating ship state parameters can be accomplished using single-tone (single frequency) or multiple-tone (multiple frequencies) estimation techniques, the multiple-tone estimation techniques are typically more effective, as the ship parameters are generally not composed of single tones. Since the frequencies of motion may change over time, the estimation technique will throw out older data, while continuing to use new data. The period of time over which data is used in the estimation process needs to reflect that a few complete cycles of the longest period significant sinusoid are needed for the estimation process.

The estimation process is performed at the same rate as the incoming ship state data. When the ship state message is no longer available from the datalink because of an interruption, the current results of the estimation process (frequency/phase/amplitude for N sinusoids) is used to predict the sinusoidal ship motion parameters into the future. The predicted ship motion parameters are then used in place of the ship motion parameters that should have been received over the datalink.

As used herein, a "GPS epoch" is a moment in time that is used as a reference for the accumulative representation of time, for example, GPS weeks and seconds in GPS time (GPST). The present method can be implemented as part of a larger avionics software package, such as in JPALS or Navy UCAS.

FIG. 1 is a flow diagram of a method for identification of ship state tonal parameters during a relative GPS shipboard landing. At a new GPS epoch 110, a determination is made whether ship state data is available at block 112. When the ship state data is not available, a determination is made whether a ship tonal parameter estimation is complete at block 114. If the ship tonal estimation is not complete, the method goes to a new epoch 116. Returning to block 112, when the ship state data is available, the ship state data is received and an estimation of tonal parameters of the ship state data is performed at block 118.

Returning to block 114, when the ship tonal parameter estimation is complete, the ship state data is estimated using the last received ship state data and estimates of ship tonal parameters at block 120. Ship tonal estimates from block 118 may be used in estimating the ship state data in block 120. One or more relative navigation algorithms, such as a difference of ship and aircraft position, or a more precise relative navigation algorithm utilizing GPS carrier phases, are then run at block 122 using the received ship state data from block 118 if available, or the estimated ship state data from block 120 if a datalink between the aircraft and ship is lost. The method then goes to a new epoch 124 after the current epoch and the foregoing method can be repeated prior to landing of the aircraft.

Figure 2:
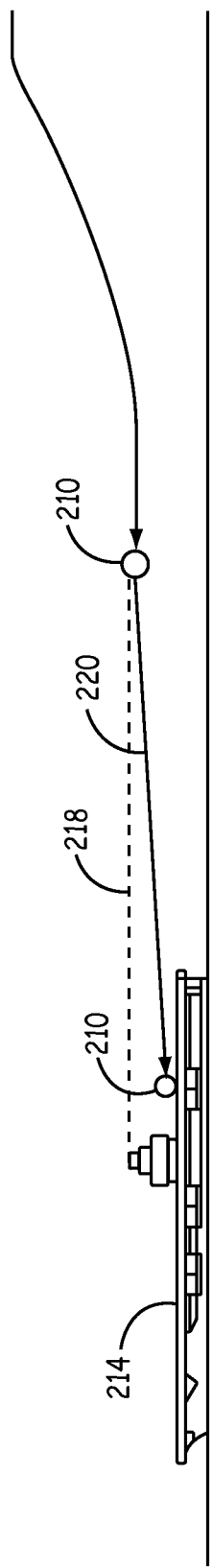
FIG. 2 is a schematic diagram illustrating the final approach and landing of an aircraft on an aircraft carrier that can implement the method of FIG. 1.

FIG. 2 is a schematic diagram illustrating the final approach and landing of an aircraft 210 on an aircraft carrier 214 that can implement the present method. During the final approach, aircraft 210 is in communication with aircraft carrier 214 through a datalink 218 to receive ship state data. In the final few seconds prior to landing, such as along flight path 220, datalink 218 might be lost, at which point the present method provides the necessary data to aircraft 210 for a safe landing on aircraft carrier 214.

Figure 3:
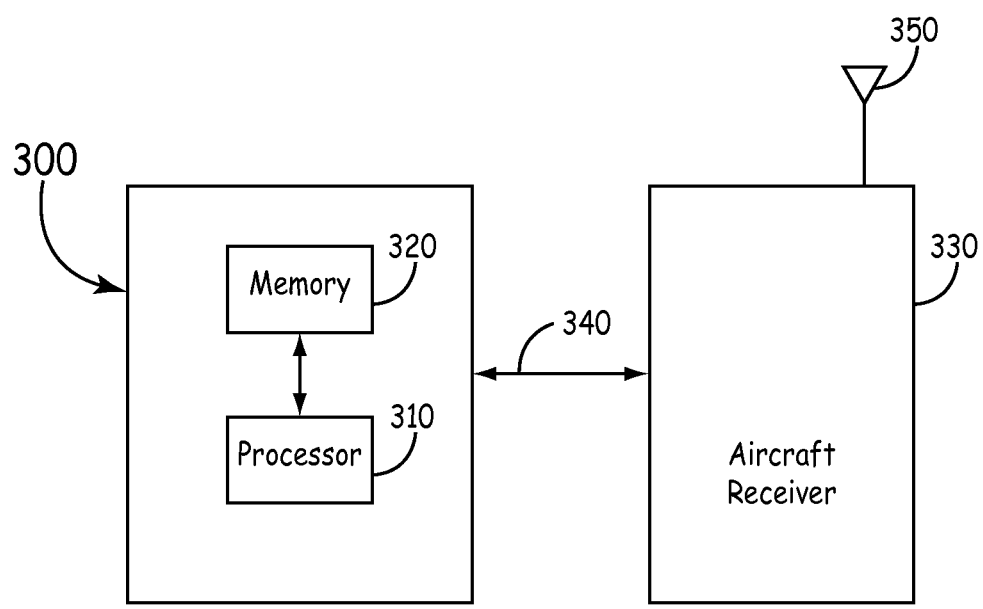
FIG. 3 is a block diagram of a computer system that can implement the method of FIG. 1.

FIG. 3 is a block diagram of one embodiment of a computer system 300 that can implement the present method for identification of ship state tonal parameters during an approach and shipboard landing of an aircraft. The computer system 300 such as an avionics computer generally includes at least one processor 310, and at least one memory device 320 in operative communication with processor 310. The computer system 300 is in operative communication with an aircraft receiver 330 through a wired or wireless connection 340 as known to those skilled in the art. The receiver 330 is configured to receive a datalink transmission from a ship through at least one antenna 350. The memory device 300 includes at least one computer readable medium having instructions executable by processor 310 to perform the present method.

The processor 310 can be implemented using software, firmware, hardware, or any appropriate combination thereof, as known to one of skill in the art. By way of example and not limitation, hardware components for processor 310 can include one or more microprocessors, memory elements, digital signal processing (DSP) elements, interface cards, and other standard components known in the art. Any of the foregoing may be supplemented by, or incorporated in, specially-designed application-specific integrated circuits (ASICs) or field programmable gate arrays (FPGAs). In this exemplary embodiment, processor 310 includes or functions with software programs, firmware, or other computer readable instructions for carrying out various process tasks, calculations, and control functions, used in the present method. These instructions are typically tangibly embodied on any appropriate computer program product that includes a computer readable medium used for storage of computer readable instructions or data structures.

The memory device 320 can be implemented with any available computer readable storage media that can be accessed by a general purpose or special purpose computer or processor, or any programmable logic device. Suitable computer readable media may include storage or memory media such as magnetic or optical media. For example, storage or memory media may include conventional hard disks, Compact Disk—Read Only Memory (CD-ROM), DVDs, volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), and the like), Read Only Memory (ROM), Electrically Erasable Programmable ROM (EEPROM), flash memory, Blu-ray discs, and the like. Combinations of the above are also included within the scope of computer readable media.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Although specific embodiments have been illustrated and described herein, it will be appreciated by those of ordinary skill in the art that any arrangement, which is calculated to achieve the same purpose, may be substituted for the specific embodiments shown. The described embodiments are to be considered in all respects only as illustrative and not restrictive. The scope of the invention is therefore indicated by the following claims rather than by the foregoing description. All changes that come within the meaning and range of equivalency of the claims are to be embraced within their scope.

What is claimed is:

1. A method for identification of ship state tonal parameters during an approach and landing of an aircraft on a ship, the method comprising:
 determining whether ship state data is available to the aircraft prior to landing of the aircraft;
 when the ship state data is available to the aircraft:
  receiving the ship state data at the aircraft; and
  estimating tonal parameters of the ship state data using a processor;
 when the ship state data is not available to the aircraft, determining whether a ship tonal parameter estimation is complete;
 when the ship tonal parameter estimation is complete, estimating ship state data using any last received ship state data and estimates of the ship tonal parameters; and
 running one or more relative navigation algorithms using the received ship state data or the estimated ship state data to safely land the aircraft on the ship.

2. The method of claim 1, wherein the aircraft is landed using a relative global positioning system (GPS) shipboard landing technique.

3. The method of claim 2, wherein the relative GPS shipboard landing technique is implemented in a system comprising a Joint Precision Approach and Landing System (JPALS) or a Navy Unmanned Combat Air System (UCAS).

4. The method of claim 1, wherein determining whether ship state data is available to the aircraft prior to landing of the aircraft is carried out during a first GPS epoch.

5. The method of claim 1, wherein the ship state data comprises one or more of velocity, acceleration, or Euler angles.

6. The method of claim 1, wherein the ship state data comprises ship state parameters including one or more of roll, pitch, heading, heave, surge, or sway, wherein each of the ship state parameters have corresponding sinusoids.

7. The method of claim 1, wherein the tonal parameters of the ship state data are estimated using a single-tone sinusoidal estimation technique.

8. The method of claim 1, wherein the tonal parameters of the ship state data are estimated using a multiple-tone sinusoidal estimation technique.

9. The method of claim 6, wherein the tonal parameters comprise frequency, amplitude, and phase of the sinusoids of the ship state parameters.

10. The method of claim 1, wherein during receiving of the ship state data at the aircraft, the tonal parameters of the ship state data are continually estimated.

11. A computer program product, comprising:
a non-transitory computer readable storage medium having instructions stored thereon executable by a processor to perform a method for identification of ship state tonal parameters during an approach and landing of an aircraft on a ship, the method comprising:
determining whether ship state data is available to the aircraft prior to landing of the aircraft;
when the ship state data is available to the aircraft:
receiving the ship state data at the aircraft; and
estimating tonal parameters of the ship state data;
when the ship state data is not available to the aircraft, determining whether a ship tonal parameter estimation is complete;
when the ship tonal parameter estimation is complete, estimating ship state data using any last received ship state data and estimates of the ship tonal parameters; and
running one or more relative navigation algorithms using the received ship state data or the estimated ship state data to safely land the aircraft on the ship.

12. The computer program product of claim 11, wherein determining whether ship state data is available to the aircraft prior to landing of the aircraft is carried out during a first GPS epoch.

13. The computer program product of claim 11, wherein the ship state data comprises one or more of velocity, acceleration, or Euler angles.

14. The computer program product of claim 11, wherein the ship state data comprises ship state parameters including one or more of roll, pitch, heading, heave, surge, or sway, wherein each of the ship state parameters have corresponding sinusoids.

15. The computer program product of claim 11, wherein the tonal parameters of the ship state data are estimated using a single-tone sinusoidal estimation technique.

16. The computer program product of claim 11, wherein the tonal parameters of the ship state data are estimated using a multiple-tone sinusoidal estimation technique.

17. The computer program product of claim 14, wherein the tonal parameters comprise frequency, amplitude, and phase of the sinusoids of the ship state parameters.

18. The computer program product of claim 11, wherein during receiving of the ship state data at the aircraft, the tonal parameters of the ship state data are continually estimated.

19. A system for identification of ship state tonal parameters during a relative GPS shipboard landing of an aircraft, the system comprising:
a receiver on an aircraft configured to receive a datalink transmission from a ship;
at least one processor operatively coupled to the receiver; and
at least one non-transitory computer readable storage medium operatively coupled to the processor, the computer readable storage medium having instructions executable by the processor to perform a method comprising:
determining whether ship state data is available to the aircraft prior to landing of the aircraft;
when the ship state data is available to the aircraft:
receiving the ship state data at the aircraft; and
estimating tonal parameters of the ship state data;
when the ship state data is not available to the aircraft, determining whether a ship tonal parameter estimation is complete;
when the ship tonal parameter estimation is complete, estimating ship state data using any last received ship state data and estimates of the ship tonal parameters; and
running one or more relative navigation algorithms using the received ship state data or the estimated ship state data to safely land the aircraft on the ship.

20. The system of claim 19, wherein the instructions executable by the processor are implemented as part of a Joint Precision Approach and Landing System (JPALS) or a Navy Unmanned Combat Air System (UCAS).

* * * * *